July 14, 1959  M. McDONALD  2,894,352
ANIMAL TRAP
Filed April 4, 1957
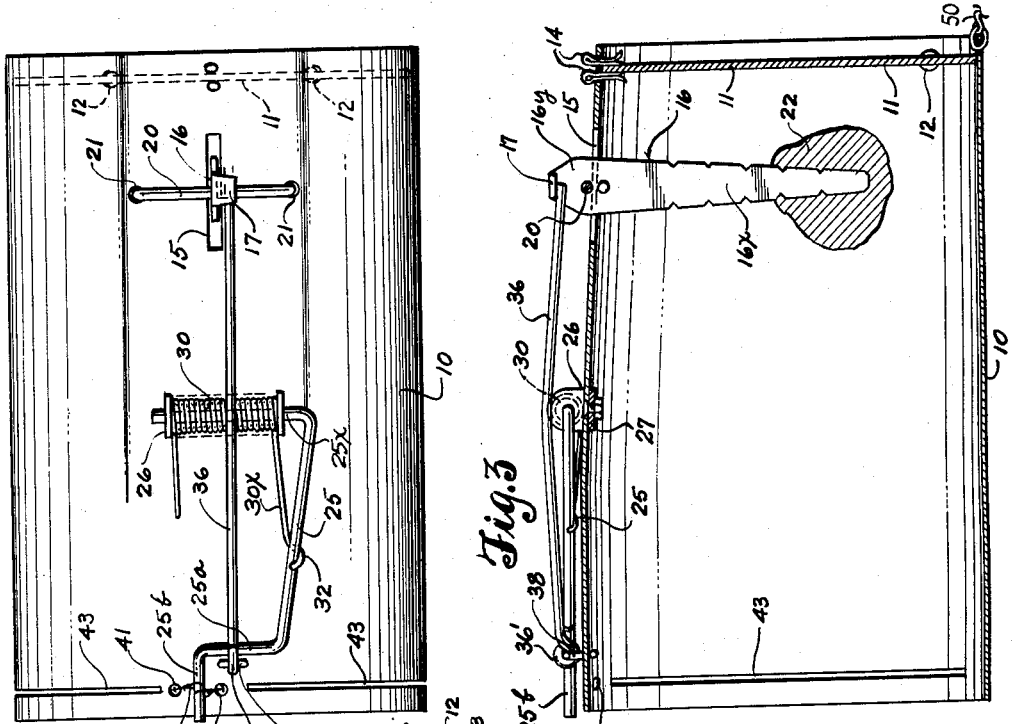
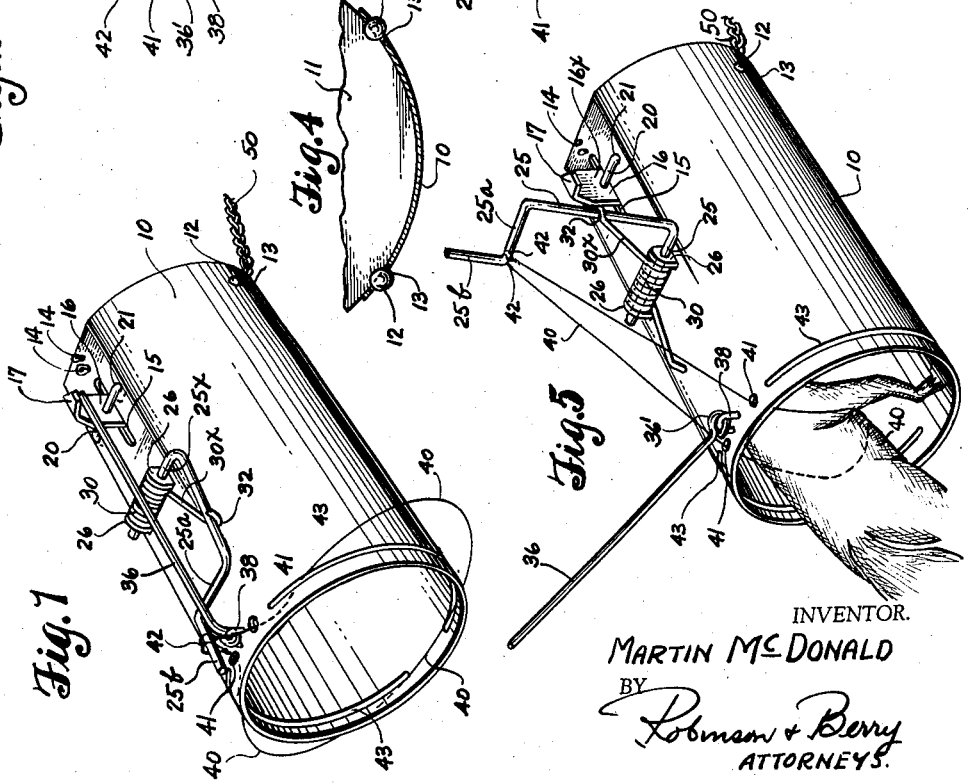
INVENTOR.
MARTIN McDONALD
BY
Robinson & Berry
ATTORNEYS.

United States Patent Office 2,894,352
Patented July 14, 1959

2,894,352
ANIMAL TRAP

Martin McDonald, Renton, Wash., assignor of one-half to Charles B. Ridlinghafer, Seattle, Wash.

Application April 4, 1957, Serial No. 650,736

1 Claim. (Cl. 43—87)

This invention relates to animal traps. More particularly, it is concerned with traps that are best suited for the catching of such animals as mink, marten, rats, prairie dogs and other animals of like kind.

It is the principal object of this invention to provide a trap which employs a loop-like snare or noose as differentiated from traps of the jaw types; that is easy to set; that is simple in its operation; inexpensive in construction, and very effective in its use.

It is also an object of the invention to provide a trap that causes no damage to the fur or body of the animal and which is not inhumane in character.

Further objects and advantages of the present invention reside in the details of construction of its various parts and in their combination and functional relationship in the use of the trap.

In accomplishing the above mentioned and other objects of the invention, I have provided the improved details of construction, the present preferred forms of which are illustrated in the accompanying drawings, wherein:

Fig. 1 is a perspective view of the present trap, showing it in "set" position.

Fig. 2 is a top view of the trap and also showing it "set" for use.

Fig. 3 is a central section of the trap taken longitudinally thereof and in its central vertical plane.

Fig. 4 is a sectional detail showing the means for holding the lower edge of the rear end closure disk in place.

Fig. 5 is a perspective view of the trap as sprung to catch and hold an animal therein.

Referring more in detail to the drawings:

In its present preferred form, the trap comprises a tubular housing 10, preferably made of sheet metal, or other similar sheet material. The size of such a housing may be varied to suit desires or requirements, however, for ordinary and intended uses, it would be approximately ten inches long and four inches in diameter. The forward end of the housing is open as seen in Fig. 1 but its opposite, or rear end, is normally closed by a removable closure 11 of disk form. This closure disk is equipped at its lower edge with two laterally spaced spherical lugs 12—12, pinched thereon, and which, as shown in the sectional detail of Fig. 4, are holdingly seated in holes 13—13 formed to receive them in the wall of the housing 10. The top edge of the disk is held in position between two pins or cotter-keys 14—14 that are passed downwardly through holes formed in spaced relationship through the top of the housing. To remove this closure disk, it is only necessary to pull out the retaining pin or key that is at the outside of the disk and swing the disk outwardly. This removal of the closure is to give easy access to the trigger and for baiting as will presently be explained.

Formed in the top wall of the housing, just forward of the rear end closure 11, is a longitudinally directed slot 15, and extended through this is the trigger member designated generally by reference numeral 16. The trigger comprises a spike-like strip of metal that terminates in a tapered lower end portion 16x which extends well into the housing. Also, the trigger has a rather short upper end portion 16y that extends upwardly from the housing and terminates in a laterally turned flange 17.

The trigger is supported to swing freely in the longitudinal plane of the housing on a pivot member 20 which comprises a short length of stiff wire extended across the slot 15 and having its opposite end portions turned downwardly and passed through holes 21—21 in the housing wall and then bent toward each other to retain the wire in place.

In the use of this trap, suitable bait is applied to the spike-like lower end portion 16x of the trigger, such as indicated at 22 in Fig. 3.

Extended along the top side of the housing is the snare or noose drawing lever 25. This has its rearward end portion bent at a right angle to the longitudinal line of the housing thus providing a mounting shank 25x therefor. This shank is rotatably contained in ears 26—26 that are bent upwardly from opposite ends of metal strip 27 that is disposed inside the housing transversely thereof and secured against the top wall; the ears being extended through slots in the housing wall. This mounting shank 25x is located approximately mid-way of the front and rear ends of the housing as shown in Fig. 2.

Intermediate its ends, the lever 25 is formed with a right angle bend and a transversely directed portion 25a that brings the forward end portion 25b of the lever to the central vertical plane of the housing. The forward end of this lever 25 extends just slightly forward of the housing as shown in Fig. 2.

A coiled spring 30 is contained about the lever mounting shank 25x between the shank mounting ears, 26—26; one end of the coil spring engages against the top of the housing and its other end portion 30x is extended forwardly along the lever 25 and is hooked thereunder as at 32. The character of the spring is such that with the parts as shown in Fig. 1, it is held under tension that operates, when the lever is released, to snap it upwardly and rearwardly. When the lever 25 has been swung for setting the trap, to its forwardly directed position as in Fig. 2, it can be held there by a latch lever 36. The lever 36 is pivotally attached at its forward end by means of a loop-like end portion 36' to a loop 38 fixed in the top of the housing wall adjacent its forward end as seen best in Fig. 5. The lever 36 as thus pivotally attached, is extended rearwardly across the laterally directed portion of the forwardly directed lever 25, and also across the coil spring 30 and at its rear end is engaged beneath the laterally turned flange 17 of the trigger. Thus, it will act to retain the lever 25 in its set position against the upward acting force of spring 30.

The snare or noose is formed from a short length of piano wire 40. Opposite ends of the wire are extended upwardly through holes 41—41 formed in the top wall of the housing 10 adjacent its forward end, and are equipped with loops 42—42 that are applied over the forward end portion 25b of lever 25. The wire is formed into an open loop or noose located within the forward end of the housing. This loop has its opposite side portions projected outwardly through slots 43—43 that are formed in opposite sides of the housing close to its forward end. The bottom of the loop lies against the bottom wall of the housing as in Fig. 1 thus providing that an animal, in entering the open end of the housing, will dispose its body within the loop.

The housing 10 is equipped at its rearward end with an anchoring chain 50 whereby it can be secured to a stake or stump.

Assuming the trap to be so formed, and that it has been

"set" for catching an animal, as shown in Fig. 1, it operates as follows:

The animal enters the housing 10 through the open forward end, usually getting about half-way in, in order to reach the bait. On reaching the bait, it grasps and pulls the bait forwardly. This causes the lower end of the trigger 16 to be pulled forwardly and its upper end portion to be swung rearwardly. This causes the rear end of the latch lever 36 to be disengaged from the flange 17 on the trigger 16 and frees the lever arm 25, allowing it to be swung upwardly and rearwardly by the released force of spring 30; the movement of lever 25 draws the loop upwardly and tightly about the animal, usually in the case of a mink, engaging it just rearward of the front legs with quick killing tension. This, however, causes no damage to the fur of the animal.

To release the animal, the lever 25 is swung forwardly and the ends of the snare wire 40 are disengaged therefrom, thus taking off all holding tension.

Traps of this kind are easy to set, and effective in use. When placed in position for use, they can be disguised in various ways depending on the place of use. However, this has no bearing on the invention itself.

It is also to be understood that the housing could be made of square or rectangular form without departing from the spirit of the invention.

It is further readily apparent that various details of construction, other than those specifically described, might be employed with satisfactory results.

I claim as new:

An animal trap comprising a tubular housing, open at its forward end for entrance of an animal and formed through its top wall near its rearward end with a longitudinal slot and near its forward end with two laterally spaced holes and in its opposite sidewalls, in alignment with said holes, with open slots leading from near said holes, respectively, to near the center line of the bottom of said housing, a lever arm having a transversely directed end portion pivoted on top of the housing between said longitudinal slot and holes and having an outer end portion extended forwardly and between said holes, a spring acting under tension against the mounting end portion of the lever and housing arm to swing the arm upwardly when released at its free end, a latch lever pivoted at one end to the forward end of said housing and extended across the free end of said lever arm to normally hold it in a "set" position against the force of said spring, a flexible wire strand formed into an open noose, connected at its ends, through said holes to the outer end of the lever arm and resting at its base against the top side of the bottom wall of said housing between the lower ends of said slots with its side portions extended outwardly through said slots and a trigger member extended through said longitudinal slot pivoted to said housing and having its top end releasably engaged with the swinging end of said latch lever and its lower end equipped for actuation by the entering animal to release its outer end from the latch lever.

References Cited in the file of this patent

UNITED STATES PATENTS

| 551,412 | Stephens | Dec. 17, 1895 |
| 895,017 | Hooker | Aug. 4, 1908 |
| 2,348,002 | Glass | May 2, 1944 |

FOREIGN PATENTS

| 19,314 | Great Britain | 1903 |